3,766,146
SEGMENTED THERMOPLASTIC COPOLYESTER
ELASTOMERS
William K. Witsiepe, Wilmington, Del., assignor to E. I.
du Pont de Nemours and Company, Wilmington, Del.
No Drawing. Filed Mar. 18, 1971, Ser. No. 125,860
The portion of the term of the patent subsequent to
Mar. 21, 1989, has been disclaimed
Int. Cl. C08g 17/08
U.S. Cl. 260—75 R            9 Claims

ABSTRACT OF THE DISCLOSURE

Segmented thermoplastic copolyester elastomers containing recurring polymeric long chain ester units derived from dicarboxylic acids and long chain glycols and short chain ester units derived from dicarboxylic acids and low molecular weight diols. At least 80% of the dicarboxylic acid used is terephthalic acid and at least 80% of the low molecular weight diol is 1,4-butanediol. The short chain ester units constitute about 48–65% by weight of the polymer. Such copolyesters rapidly harden from the molten state and have outstanding physical properties, especially tear strength, abrasion resistance and flex life.

BACKGROUND OF THE INVENTION

Linear copolyesters have been produced heretofore for various purposes, particularly for the production of films and fibers, but known polymers of this type have not been as effective as would be desired for some applications such as, for example, molded vehicle tires where superior tear strength, tensile strength, flex life and abrasion resistance are necessary. Moreover, known copolyesters generally harden very slowly from the molten state which property greatly reduces their effectiveness in injection molding applications. There has been a need, therefore, for a thermoplastic elastomer combining rapid hardening rates with superior tear strength, tensile strength, flex life, and abrasion resistance properties.

SUMMARY OF THE INVENTION

According to this invention there is provided a thermoplastic copolyester elastomer consisting essentially of a multiplicity of recurring intralinear long chain and short chain ester units connected head-to-tail through ester linkages, said long chain ester units being represented by the following structure:

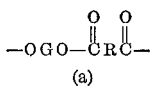

(a)

and said short chain ester units being represented by the following structure:

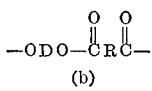

(b)

wherein:

G is a divalent radical remaining after removal of terminal hydroxyl groups from poly(alkylene oxide) glycols having a carbon to oxygen ratio of about 2.5–4.3, a molecular weight above about 400 and a melting point below about 60° C.;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250;

with the provisos that the short chain ester units constitute about 48–65% by weight of the copolyester, at least about 80% of the R groups must be 1,4-phenylene radicals, at least about 80% of the D groups must be 1,4-butylene radicals, and the sum of the percentages of the R groups which are not 1,4-phenylene radicals and of the D groups which are not 1,4-butylene radicals cannot exceed about 20%.

DETAILED DESCRIPTION

The term "long chain ester units" as applied to units in a polymer chain refers to the reaction product of a long chain glycol with a dicarboxylic acid. Such "long chain ester units," which are a repeating unit in the copolyesters of this invention, correspond to the Formula a above. The long chain glycols are polymeric glycols having terminal (or as nearly terminal as possible) hydroxy groups and a molecular weight above about 400 and preferably from about 400–4000. The long chain glycols used to prepare the copolyesters of this invention are poly(alkylene oxide) glycols having a carbon to oxygen ratio of about 2.5–4.3. Representative long chain glycols are poly(1,2- and 1,3-propylene oxide) glycol, poly(tetramethylene oxide) glycol, random or block copolymers of ethylene oxide and 1,2-propylene oxide (used in proportions such that the carbon to oxygen mole ratio in the glycol exceeds 2.5) and random or block copolymers of tetrahydrofuran with minor amounts of a second monomer such as methyltetrahydrofuran (used in proportions such that the carbon to oxygen mole ratio in the glycol does not exceed about 4.3).

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula b above.

Included among the low molecular weight diols (other than 1,4-butanediol) which react to form short chain ester units are acyclic, alicyclic and aromatic dihydroxy compounds. Preferred are diols with 2–15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bisphenols which can be used are bis(p-hydroxy) diphenyl, bis(p - hydroxyphenyl) methane, and bis(p - hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which are reacted with the foregoing long chain glycols and low molecular weight diols to produce the copolyesters of this invention are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl) methane, p-oxy(p-carboxyphenyl) benzoic acid, ethylene-bis(p-oxybenzoic acid) 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1$–$C_{12}$ alkyl and ring substitution derivatives thereof, such as halo, alkoxy, and aryl derivatives. Hydroxyl acids such as p-(β-hydroxyethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., phthalic and isophthalic acids.

It is essential that at least about 80 mole percent of the dicarboxylic acid incorporated into the polymer be terephthalic acid and at least about 80 mole percent of the low molecular weight diol incorporated into the polymer be 1,4-butanediol. Thus, at least 80% of the R groups in Formulae a and b above are 1,4-phenylene radicals and at least about 80% of the D groups in Formula b above are 1,4-butylene radicals. A further requirement in making the polymers of this invention is that the sum of the percentages of the R groups which are not 1,4-phenylene radicals and of the D groups which are not 1,4-butylene radicals cannot exceed about 20%. For example, if 20% of the low molecular weight diol molecules used are other than 1,4-butanediol, then all of the dicarboxylic acid used must be terephthalic acid, or if 10% of the low molecular weight diol molecules used are other than 1,4-butanediol, then at least about 90% of the dicarboxylic acid used must be terephthalic acid. Copolyesters having fewer 1,4-butylene terephthalate units than is assured by the foregoing proportions do not have sufficiently rapid hardening rates. The D and R units which are not 1,4-butylene and 1,4-phenylene, respectively, can be derived from any of the low molecular weight diols or dicarboxylic acids named above.

The copolyesters of this invention contain about 48–65% by weight of short chain ester units corresponding to Formula b above, the remainder being long chain ester units corresponding to Formula a above. When the copolyesters contain less than about 48% by weight short chain units, the tear strength and solvent resistance of the copolyesters fall to undesirably low levels and when the copolyesters contain more than about 65% short chain units, the low temperature properties worsen and the copolyesters become less elastomeric. The optimum balance of properties is obtained when the short chain ester content is about 55–60%.

The preferred copolyesters of this invention are those prepared from dimethyterephthalate, 1,4-butanediol and poly(tetramethylene oxide) glycol having a molecular weight from about 600–2000.

The polymers described herein can be made conveniently by a conventional ester interchange reaction. A preferred procedure involves heating the dimethyl ester of terephthalic acid with a long chain glycol and a molar excess of a butanediol in the presence of a catalyst at 150 to 260° C. followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

The resulting prepolymer is then carried to high molecular weight by distillation of the excess of short chain diol. This process is known as "polycondensation." Additional ester interchange occurs during this distillation to increase the molecular weight and to randomize the arrangement of the copolyester units. Best results are usually obtained if this final distillation or polycondensation is run at less than 1 mm. pressure and 240–260° C. for less than 2 hours in the presence of antioxidants such as sym-di-beta-naphthyl-p-phenylenediamine and 1,3,5-trimethyl-2,4,6-tris[3,5 - ditertiary-butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as Mg[HTi(OR)₆]₂, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvens can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess many desirable properties, it is sometimes advisable to stabilize certain of the compositions to heat or radiation by ultraviolet light. Fortunately, this can be done very readily by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4'-bis(2,6-ditertiary-butylphenyl),1,3,5-trimethyl-2,4,6-tris[3,5-ditertiary-butyl - 4 - hydroxybenzyl]benzene and 4,4' - butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis (beta-naphthyl)-p-phenylenediamine, N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft polyesters of this invention.

The copolyesters of this invention have superior physical properties. They are particularly outstanding in their tear strength, abrasion resistance and general low temperature properties. Because of their rapid hardening rates, they are especially effective in injection molding applications and their relatively low melt viscostiy (particularly at low shear), excellent thermal stability at processing temperature, rapid hardening rates, good flow and mold wetting characteristics, and relative insensitivity to moisture allow the polymers of this invention to be processed by substantially all procedures which have been used for thermoplastics in general and, in many instances, they offer significant processing advantage over competitive thermoplastic polymers. The materials can be injection, compression, transfer and blow molded to form elastic bmol molded articles (such as tires), which may include inserts, if desired, meeting close tolerances. They can be readily extruded to produce films (blown or unblown), tubing, other forms having complicated cross sections, and cross-head extruded for hose, wire, cable and other substrate covers. They can be readily calendered to produce films and sheeting or to produce calender-coat woven and non-woven fabrics and other substances.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber and heat fused coating (for flexible substrates).

The melt viscosity and stability characteristics of these offer advantages for use in certain coating and adhesive procedures such as dip, transfer, roller and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendering operations and allows penetration into the substrate, if desired.

All parts, proportions and percentages disclosed herein are by weight unless otherwise indicated. The following examples further illustrate the invention.

EXAMPLES

The following ASTM methods are employed in determining the properties of the polymers prepared in the examples which follow.

| | |
|---|---|
| Modulus at 100% elongation, $M_{100}$ | D412 |
| Modulus at 300% elongation, $M_{300}$ | D412 |
| Tensile at break, $T_B$ | D412 |
| Split tear | D470 |
| Bashore resilience, percent | D1054 |
| Trouser tear | [1] D470 |
| Oil swell | D471 |

[1] Modified by use of 1.5″ x 3″ sample with 1.5″ cut on the long axis of the sample. This configuration prevents "necking down" at the point of tearing.

The following catalysts are used in preparing the compositions of the examples:

Catalyst A

Solution 1 is a prepared by dissolving 111.05 ml. of tetrabutyl titanate in 900 ml. of dry butanol-1.

Solution 2 is prepared by dissolving 3 g. of anhydrous magnesium acetate in 100 ml. of dry methanol.

In the examples which follow, 2 parts by volume of Solution 1 mixed with 1 part by volume of Solution 2 is used.

Catalyst B.—Tetrabutyl titanate

EXAMPLE 1

The following materials are placed in a 500 ml. flask fitted for distillation:

| | G. |
|---|---|
| Polytetramethyleneether glycol; number average molecular weight about 975 | 385 |
| 1,4-butanediol | 365 |
| Dimethyl terephtalate | 600 |
| Sym-di-beta-naphthyl-p-phenylenediamine | 2.98 |

A stainless steel stirrer with a paddle cut to conform with the internal radius of the flask is positioned about 1/8" from the bottom of the flask and agitation is started. The flask is placed in an oil bath at 160° C., agitated for five minutes and then 7.1 ml. of Catalyst A is added. Methanol distills from the reaction mixture as the temperature is slowly raised to 250° C. over a period of one hour. When the temperature reaches 250° C. the pressure is gradually reduced to 0.3 mm. Hg within 20 minutes. The polymerization mass is agitated at 250° C./0.3 mm. Hg for 90 minutes. The resulting viscous molten product is scraped from the flask in a nitrogen (water and oxygen free) atmosphere and allowed to cool. The inherent viscosity of the product at a concentration of 0.1 g./dcl. in m-cresol at 30° C. is 1.65. Samples for physical testing are prepared by compression molding at about 220° C. for one minute and cooling rapidly in the press. The polymer has a Shore D hardness of about 55.

For comparison a control polymer is prepared using ethylene glycol in place of butanediol by the following procedure.

In an agitated reactor fitted with a distillation column, 1821 ml. of ethylene glycol, 2880 g. of dimethyl terephthalate, 18.9 g. 1,3,5-trimethyl-2,4,6-tris(3,5-ditertiary-butyl-4-hydroxybenzyl) benzene and 2.1 ml. of Catalyst B are agitated and heated. Reflux rate is adjusted so that the temperature at the head of the distillation column is maintained at 70° C. while methanol is removed. When substantially all of the methanol has been removed, the head temperature rises abruptly to about 180° C. Heating and distillation of ethylene glycol is continued until the temperature in the reactor reaches 230° C. The resulting product is cast under nitrogen and crushed.

In a 300 ml. distillation flask with a close fitting agitator is placed 36.0 g. of the dimethyl terephthalate/ethylene glycol reaction product, 14.0 g. of polytetramethyleneether glycol having a number average molecular weight of about 1000, 0.1 g. sym-di-beta-naphthyl-p-phenylenediamine and 0.4 ml. of a solution of 5 ml. of Catalyst B in 45 ml. of xylene. The flask is immersed in a 260° C. oil bath and the mixture is agitated for 5 minutes under nitrogen. While maintaining the oil bath at 260° C., full vacuum is carefully applied to the system. After 48 minutes, the pressure is reduced to 0.025 mm. Hg and the polymer is removed from the flask under nitrogen. Samples for physical testing are prepared by compression molding at 250–260° C. The polymer has an inherent viscosity of about 1.1 measured in a solution of 0.1 g./dcl. in m-cresol at 30° C. The control polymer has a Shore hardness of 55.

Properties of the polymer of this example and the control polymer are shown in Table I.

TABLE I

| | Polymer of this example | Control |
|---|---|---|
| Short chain ester units, percent by weight | 57.8 | 60.8 |
| $M_{100}$, p.s.i. | 2,000 | 2,250 |
| $M_{300}$, p.s.i. | 2,275 | 3,750 |
| $T_B$, p.s.i. | 5,900 | 4,900 |
| $E_B$, percent | 700 | 420 |
| Trouser tear, p.l.i. (50"/min.) | 396 | 290 |
| Oil swell, percent volume increase ASTM No. 3 oil, 7 days, 100° C.) | 12.2 | 12.2 |
| Polymer melt temperature [1] | 201 | 236 |

[1] Determined by differential scanning colorimetry.

The control polymer exhibits a poorer high speed trouser tear than the polymer of this invention. In hand tear tests, the control polymer shows even greater deficiency.

The difference in the hardening rate of the polymer of this example and the control is illustrated by the following test. Discs, 5/8 inch in diameter and 1/8 inch thickness, of each polymer are prepared by compression molding for 6 minutes at 275° C. The molds are quenched in 20° C. water for 55 seconds and opened immediately. Penetration of a 1/8 inch diameter probe into the molded discs is determined at various times after quenching. The initial penetrometer reading (zero reading) is made at 40 p.s.i. after which the probe is weighted to 400 p.s.i. and readings of penetration versus time recorded.

The following results are obtained with the polymer of this example.

5 SECONDS AFTER QUENCHING

| Time, sec.: | Penetration, mm. |
|---|---|
| 0 | 0 |
| 15 | 0.15 |
| 75 | 0.15 |
| 135 | 0.16 |

3 MINUTES AFTER QUENCHING

| Time, sec.: | Penetration, mm. |
|---|---|
| 0 | 0 |
| 15 | 0.15 |
| 75 | 0.15 |
| 135 | 0.15 |

Results for the control polymer are as follows:

1 MINUTE AFTER QUENCHING

| Time, sec.: | Penetration, mm. |
|---|---|
| 0 | 0 |
| 15 | 0.9 |
| 75 | 1.1 |
| 135 | 1.2 |

12 MINUTES AFTER QUENCHING

| Time, sec.: | Penetration, mm. |
|---|---|
| 0 | 0 |
| 15 | 0.9 |
| 75 | 1.0 |
| 135 | 1.1 |

18 HOURS AFTER QUENCHING

| Time, sec.: | Penetration, mm. |
|---|---|
| 0 | 0 |
| 15 | 0.1 |
| 75 | 0.1 |
| 135 | 0.1 |

The measurements show that the polymer of this example reaches its final hardness and resistance to creep almost immediately. In contrast, the control polymer has not reached its ultimate hardness after 12 minutes.

The polymer of this example and the control polymer are representative of thermoplastic copolyester elastomers based on 1,4-butylene/terephthalate and ethylene terephthalate short chain units. The higher melting point of polymers containing ethylene terephthalate units requires the use of higher temperatures during preparation and processing which leads to increased degradation of the polymer due to the limited thermal stability of the poly(alkylene oxide) long chain units. These considerations narrow the useful processing temperature range of the ethylene terephthalate polymers to temperatures near the polymer melting point, where melt viscosities are high.

EXAMPLE 2

Substantially following the procedures described in Example 1, a thermoplastic copolyester elastomer is prepared from the following materials.

Plytetramethyleneether glycol, number average molecular weight 980 _____ g__ 25.3
Dimethyl terephthalate _____ g__ 30.0
1,4-butanediol _____ g__ 17.3
Sym-di-beta-naphthyl-p-phenylenediamine __ g__ 0.16
Catalyst A _____ ml__ 0.36

The resulting product has an inherent viscosity of 1.57 measured by the procedure described in Example 1. Samples for physical testing are prepared by compression molding at 215–220° C. for one minute and cooling rapidly in the press.

Properties of the polymer at 25° C. are shown in Table II.

TABLE II

| | |
|---|---|
| Short chain ester units, percent by weight | 49.8 |
| $M_{100}$, p.s.i. | 1625 |
| $M_{300}$, p.s.i. | 1820 |
| $T_B$, p.s.i. | 4450 |
| $E_B$, percent | 740 |
| Trouser tear, p.l.i., 50″/min. | 300 |
| Shore D Hardness | 51 |

Even though the polymer of this example has a lower hardness and modulus than the control polymer of Example 1, its high speed trouser tear strength is about equivalent to that of the control. In hand tear tests, the control polymer of Example 1 is distinctly inferior to the polymer of this example.

EXAMPLE 3

Following the procedure described in Example 1, a polymer is prepared from the following materials.

| | |
|---|---|
| Polytetramethyleneether glycol; number average molecular weight about 975 g__ | 354 |
| 1,4-butanediol g__ | 281 |
| Dimethyl terephthalate g__ | 420 |
| Dimethyl phthalate g__ | 63 |
| Sym-di-beta-naphthyl-p-phenylenediamine g__ | 2.3 |
| Catalyst A ml__ | 5.5 |

The inherent viscosity of the product measured by the method described in Example 1 is 1.73. The polymer has a Shore A hardness of 95. Properties of the polymer at 25° C. are listed in Table III. Samples for physical testing by the above ASTM procedures are prepared by compression molding for one minute at 200–210° C. and cooling the mold rapidly in the press.

TABLE III

| | |
|---|---|
| Short chain ester units, percent by weight | 53.8 |
| Identical 1,4-butylene terephthalate short chain ester units, mole percent (calculated) | 87.0 |
| $M_{100}$, p.s.i. | 1350 |
| $M_{300}$, p.s.i. | 1580 |
| $T_B$, p.s.i. | 6300 |
| $E_B$, percent | 770 |
| Split tear, p.l.i. | 200 |
| Bashore resilience, percent | 57 |
| Trouser tear, p.l.i. 50″/min. | 375 |

What is claimed is:

1. A segmented thermoplastic copolyester elastomer which hardens rapidly from the molten state consisting essentially of a multiplicity of recurring long chain ester units and short chain ester units joined head-to-tail through ester linkages, said long chain ester units being represented by the formula (I) 

and said short chain units being represented by the formula (II) 

where G is a divalent radical remaining after the removal of terminal hydroxyl groups from a poly(alkylene oxide) glycol having a melting point of less than about 60° C., a molecular weight of about 400–4000 and a carbon to oxygen ratio of about 2.5–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided,
  (a) said short chain ester units amount to about 48–65% by weight of said copolyester,
  (b) at least about 80% of the R groups in Formulae (I) and (II) are 1,4-phenylene radicals and at least about 80% of the D groups in Formula II are 1,4-butylene radicals, and
  (c) the sum of the percentages of R groups which are not 1,4-phenylene radicals and of D groups which are not 1,4-butylene radicals does not exceed about 20.

2. A segmented thermoplastic copolyester of claim 1 wherein substantially all of the dicarboxylic acid reactant is terephthalic acid.

3. A segmented thermoplastic copolyester of claim 1 wherein the dicarboxylic acid reactant is a mixture of terephthalic acid and isophthalic acid.

4. A segmented thermoplastic copolyester of claim 1 wherein the dicarboxylic acid reactant is a mixture of terephthalic acid and phthalic acid.

5. A segmented thermoplastic copolyester of claim 1 wherein substantially all of the diol having a molecular weight less than 250 is 1,4-butanediol.

6. A segmented copolyester of claim 1 wherein the poly(alkylene oxide) glycol is poly(tetramethylene oxide) glycol having a molecular weight of about 600–2000.

7. A segmented copolyester of claim 1 wherein the short chain ester units constitute about 55–60% by weight of the polymer.

8. A segmented copolyester of claim 1 wherein the dicarboxylic acid is terephthalic acid, the poly(alkylene oxide) glycol is poly(tetramethylene oxide) glycol having a molecular weight of about 600–3000 and the diol having a molecular weight less than 250 is 1,4-butanediol.

9. A segmented copolyester of claim 8 wherein the short chain ester units constitute about 55–60% by weight of the polymer.

References Cited

UNITED STATES PATENTS 3,023,192  2/1962  Shivers _____ 260—75
3,651,014  3/1972  Witsiepe _____ 260—75 R

OTHER REFERENCES

Nishimura et al.: J. Macromol. Sci., Part A (1)4, 617–25 (1967).

MELVIN GOLDSTEIN, Primary Examiner

U.S. Cl. X.R.

260—40 R, 45.7 R, 45.75 R, C & N, 45.8 N, 45.85, 45.9 R, 45.95, 860